United States Patent [19]

Morozov, deceased et al.

[11] Patent Number: 5,301,518

[45] Date of Patent: Apr. 12, 1994

[54] EVAPORATIVE AIR CONDITIONER UNIT

[75] Inventors: Victor A. Morozov, deceased, late of Moscow, by Anzhelika R. Morozova, heiress; Serguei P. Kanachine, Moscow; Iouri I. Krasnochtchekov, Moscow; Alexandre I. Makienko, Moscow; Valentine A. Matveev, Moscow; Valeri G. Khriachtchey, Moscow, all of Russian Federation; Poi-Sik Tan, Singapore, Singapore

[73] Assignee: Acma Limited, Singapore, Singapore

[21] Appl. No.: 11,478

[22] Filed: Jan. 26, 1993

Related U.S. Application Data

[63] Continuation-in-part of Ser. No. 929,248, Aug. 13, 1992.

[51] Int. Cl.[5] ............................................. F24F 3/14
[52] U.S. Cl. .................................... 62/305; 62/314; 266/153
[58] Field of Search .............. 62/304, 305, 309, 314, 62/315, 121; 261/153, DIG. 3

[56] References Cited

U.S. PATENT DOCUMENTS

| | | | |
|---|---|---|---|
| 4,594,855 | 6/1986 | Gunther | 62/92 |
| 4,977,753 | 12/1990 | Maisotsenko | 62/121 |
| 5,050,391 | 9/1991 | Tsimerman | 62/94 |
| 5,187,946 | 2/1993 | Rotenberg et al. | 62/314 |

FOREIGN PATENT DOCUMENTS

840593  7/1981  U.S.S.R. .................. 62/309

Primary Examiner—Henry A. Bennett
Assistant Examiner—William C. Doerrler
Attorney, Agent, or Firm—D'Alessandro, Frazini & Ritchie

[57] ABSTRACT

A self-contained air conditioner unit comprises an enclosure including a first and second intake apertures positioned to communicate with outside ambient air and first, second, and third outlet apertures positioned to communicate with a habitable space in which the air conditioner is placed. A water reservoir is disposed at the bottom of the enclosure. A two-section heat exchanger is disposed in the cabinet over the water reservoir, each section comprising a plurality of vertically disposed, alternating wet air channels and dry air channels defined by substantially parallel opposing heat-transfer partitions. The first-section dry-air channels communicate with a pre-mixing chamber at intake ends thereof and an air-distributing chamber at outlet ends thereof. Each first-section wet channel communicates with the distributing chamber at intake ends thereof and the second outlet aperture at outlet ends thereof. The second heat exchange section comprises primary dry-air channels communicating with the distributing chamber at intake ends thereof and the first outlet aperture at outlet ends thereof and auxiliary dry-air channels communicating with the distributing chamber at intake ends thereof and intake ends of wet-air channel at the far ends thereof. Second-section wet-air channel communicate with the auxiliary dry-air channels at intake ends thereof and the third outlet aperture at outlet ends thereof. A wet partition comprising a capillary porous material is disposed in each of the wet-air channel, is oriented substantially parallel to the opposing heat transfer partitions and is positioned so as to substantially bisect the volume of the wet channel in which it is disposed. Each of the wet partitions extends into a volume of water contained in the water reservoir. Air moving means are provided for moving a volume of air from the first and second intake apertures through the dry-air channels and for moving air between the wet-air channel and the second and third outlet aperture.

11 Claims, 4 Drawing Sheets

EVAPORATIVE AIR CONDITIONER UNIT

RELATED APPLICATIONS

This application is a continuation-in-part of co-pending application Ser. No. 07/929,248, filed Aug. 13, 1992.

BACKGROUND OF THE INVENTION

1. Field of the Invention

The present invention relates to devices and systems for ventilation and cooling of air within a confined habitable space. More particularly, the present invention relates to a self-contained air conditioner unit suitable for cooling a confined habitable space.

2. The Prior Art

Evaporative coolers are well known in the art. So-called "swamp coolers" utilize the thermodynamic principle of adiabatic saturation. The air to be cooled is saturated with a water mist, whose evaporation from the liquid state (mist) to vapor state takes up available heat energy from the air itself, thus lowering its temperature. In this method of direct evaporative cooling, the ambient air may be cooled in the limit to its wet bulb temperature, also known as the adiabatic saturation temperature. Except in very dry climates, direct evaporative cooling is unsuitable for sustained cooling of a confined habitable space because continuous humidification of the air causes discomfort to occupants.

There also exist in the art various methods of indirect evaporative cooling, in which an airstream is first cooled by adiabatic saturation, and then used to cool a separate, non-mixing airstream across a heat-transfer partition. The latter airstream is said to be sensibly cooled; that is, cooled without altering its absolute moisture content. Such methods enable continuous cooling and recirculation of the air within a confined habitable space without the uncomfortable effects of increasing humidity.

Additionally, the prior art includes methods of pre-cooling an intake airstream before adiabatic saturation cooling, thereby enabling the airstream to be cooled below the wet bulb temperature corresponding to its initial intake conditions. In the limit, the intake airstream can be cooled to the dew point corresponding to its initial intake conditions. With relatively dry ambient conditions at intake, that is, when the ambient relative humidity is less than 40%, the dew point may be up to 10° C. below the corresponding wet bulb temperature. These methods increase the cooling capacity of the intake airstream, thus imparting a greater degree of sensible cooling to the aforementioned second airstream recirculated to and from the habitable space.

The prior art described above suffers various deficiencies in its application to air conditioning equipment for space cooling. Some of these deficiencies are described in the following paragraphs.

In some current systems, ambient air at intake is blown directly through wet-air channel, and thereby cooled by adiabatic saturation (either through application of a water mist, spray, or from wetted porous material within the channel). The wet-air channel are arranged in alternate sequence to an equal number of dry-air channels, through which a separate, non-mixing flow of room air is directed in a counter-flow or cross flow direction. This latter flow of recirculating room air is sensibly cooled by heat transfer across the partitions forming the alternative wet and dry-air channels.

The major deficiency of such systems is that since no pre-cooling is effected on the intake airstream prior to adiabatic saturation, the intake airstream can only be cooled, at the limit, to the wet bulb temperature corresponding to its condition at intake. This in turn limits its capacity to cool the secondary airstream flowing in the alternate dry-air channels. To overcome this deficiency, a majority of such systems require auxiliary methods of dehumidifying the intake ambient airstream prior to passage into the wet-air channel, thereby depressing its wet bulb temperature and increasing its usable cooling capacity. The most common methods of continuous-flow, regenerative-cycle air dehumidification utilize chemical agents such Lithium Bromide or Lithium Chloride, and are well known in the art. Invariably, such dehumidification plant is more bulky and costly than the cooling apparatus itself, and therefore imposes yet another shortcoming in the present state of the art.

Other systems in the prior art cool the intake airstream by diverting a portion of the airstream after passage through the dry-air channels, and directing the diverted portion into counter-flow wet-air channel arranged in alternate order with the dry-air channels. Such arrangements enable the intake airstream to be cooled, in the limit, to the dew point corresponding to its intake conditions, thereby increasing its usable cooling capacity. Since the portion diverted into the pre-cooling wet-air channel may be required to be as high as 50% of the original intake stream, adequate flow area must be provided in the wet-air channel for the moist airstream. Consequently, such systems suffer the design tradeoff between two detrimental factors; (i) wider channels impair heat transfer between the alternate airstreams and (ii) narrower channels cause significantly increased flow resistance, especially in the wet-air channel, thereby increasing power demand in the fan blowers.

The aforementioned systems generally channel the entire intake stream along the full length of the dry-air channels, and arrange at the outlet ends thereof to separate and divert a portion of the intake airstream into adjacent wet-air channel, causing the diverted portion to flow along the full length of the wet-air channel in a counter-flow direction to the first airstream. Such arrangements require the entire portions of the first and second airstreams to flow through substantial lengths (several hundred millimeters) of closely spaced channels in order to effect the desired degree of heat transfer. The power required in the fan blowers, and the resulting rate of airflow through the respective channels, directly determine the cooling capacity, energy efficiency, physical size, noise level, and ultimately the commercial viability of such systems. Evaporative cooling systems presently known in the art are generally deficient in respect of size/capacity/efficiency considerations, the deficiency usually resulting from design tradeoffs between (i) having sufficiently narrow channels to effect adequate heat transfer, (ii) blowing a sufficient air flowrate to attain a desired cooling capacity, and (iii) achieving an acceptable level of energy efficiency in blowing the air flowrate through the required lengths of the narrow dry-air and wet-air channel.

Most indirect evaporative cooling systems in the prior art draw intake air entirely from the outdoor ambient environment. When operating in extremely hot climatic conditions, for example, when the outside ambient dry bulb temperature exceeds 35° C., such an arrangement imposes an extreme load in pre-cooling the intake airstream. To achieve the necessary degree of pre-cooling, the portion of the intake stream diverted into the wet-air channel in the counter-flow direction may exceed 50% of the original intake stream. This pre-cooling load accordingly reduces the available cooling capacity for the habitable space. Under extremely hot ambient outdoor conditions, incomplete pre-cooling of the intake stream causes many current systems to suffer a serious decline in performance.

Yet another deficiency in current indirect evaporative cooling systems rests in the type and placement of lining material affixed to the partition walls of the wet-air channel. Optimal heat transfer across the partitions between the wet and dry-air channels would be achieved in the absence of any lining material. However it is necessary to maintain a supply of water uniformly distributed across the surfaces of the wet channel walls in order to facilitate adiabatic saturation. In the present state of the art, this is achieved through the use of absorbent capillary porous material affixed to the wet side of each partition. This material serves to distribute and retain the water introduced into the wet-air channel either by a mist, drip, or wicking arrangement.

Consequently, the majority of current systems suffer a design tradeoff between two detrimental factors: (i) capillary porous material insulates the heat transfer surfaces, thereby impeding heat transfer, (ii) an absence of material results in inadequate water distribution across the surfaces, making evaporative saturation difficult to achieve. As a compromise between the aforementioned factors, some current designs utilize material arrayed in an alternating pattern on the wet side of each partition surface.

BRIEF DESCRIPTION OF THE INVENTION

According to a first aspect of the present invention, a self-contained air conditioner unit comprises an enclosure including a first intake aperture positioned to communicate with the ambient outside air and a first outlet aperture positioned to communicate with a habitable space in which the air conditioner is placed, and a second intake aperture positioned to communicate with the habitable space in which the air conditioner is placed, and second and third outlet apertures positioned to communicate with ambient air outside of the habitable space. A water reservoir is disposed at the bottom of the enclosure.

A heat exchanger is disposed in the cabinet over the water reservoir. The heat exchanger internally comprises two separate heat exchange sections communicating with an air-distributing chamber in between. The first heat exchange section comprises a plurality of vertically disposed, alternating dry-air channels and wet air channels, the alternating dry air channels and wet air channels defined by substantially parallel opposing heat-transfer partitions. Each of the dry-air channels of the first section communicates with the first intake aperture at an intake end thereof and the aforementioned distributing chamber at an outlet end thereof. Each of the wet-air channel of the first section communicates with the distributing chamber at an intake end thereof, and with the aforementioned second outlet aperture at an outlet end thereof. The second outlet aperture is located proximal to the intake ends of the dry-air channels of the first section.

Of the air volume output comprising the entire intake airstream flowing through the first heat exchange section's dry-air channel channels, the distributing chamber serves to distribute (i) a first auxiliary air stream portion to the intake ends of each of the counter-flow wet-air channel in the first heat exchange section, (ii) a primary air stream portion to the intake ends of each of the primary dry-air channels in the second heat exchange section, and (iii) a second auxiliary air stream portion to the intake ends of each of the auxiliary dry-air channels in the second heat exchange section. The latter two portions enter the second heat exchange section in a forward-flow direction continuing that of the intake airstream flowing through the dry-air channels of the first heat exchange section.

The second heat exchange section comprises a plurality of vertically disposed, alternating dry air channels and wet air channels, the alternating dry air channels and wet air channels defined by substantially parallel opposing heat-transfer partitions. The alternating sequence is arranged in the following stacking order: (i) primary dry-air channel, (ii) wet channel, (iii) auxiliary dry-air channel, (iv) wet channel; the aforementioned sequence of (i) through (iv) being repeated across the entire width of the second heat exchange section. Each of the primary dry-air channels of the second section communicates with the aforementioned air-distributing chamber at an intake end thereof and with the first outlet aperture at an outlet end thereof. Each of the auxiliary dry-air channels of the second section communicates with the aforementioned air-distributing chamber at an intake end thereof and with two counter-flow wet-air channel at the other end thereof, one such wet channel being disposed on either side of the auxiliary dry-air channel. The outlet end of each of the wet-air channel communicates with the aforementioned third outlet aperture, located proximal to the intake end of the primary and auxiliary dry-air channels of the second section.

A wet partition comprising a capillary porous material is disposed in each of the wet-air channel in the first and second heat exchange sections. Each wet partition is oriented substantially parallel to the opposing heat transfer partitions and positioned so as to substantially bisect the volume of the wet channel in which it is disposed. At the end proximal to the intake end of each wet channel, the vertical edge of each wet partition is recessed slightly from the intake end of the wet channel itself, to a degree sufficient to allow the entering airstream to divide itself on both sides of the wet partition. Each of the wet partitions extends into the water reservoir, and its bottom edge is immersed in a volume of water contained therein.

First air moving means are provided for forcing air from the first and second intake apertures in a selected ratio to the premixing chamber, through the dry-air channels of the first heat exchange section to the distributing chamber, and thence to the first outlet aperture through the primary dry-air channels of the second heat exchange section, to the second outlet aperture through the wet-air channel of the first heat exchange section, and to the third outlet aperture through the auxiliary dry-air channels and wet-air channel of the second heat exchange section. As presently preferred, the first air moving means may constitute a first blower communicating with the first and second intake apertures and the pre-mixing chamber and, optionally, a second air moving means may comprise a blower communicating with the outlet ends of the wet-air channel venting into the second and third outlet apertures.

The wall-to-wall spacing dimensions of the dry and wet-air channel and the air velocity through the channels are chosen to produce substantially laminar air flow through the channels and to avoid turbulent air flow across the surfaces. The lengths of the airflow paths in the alternating dry and wet-air channel in the first and second heat exchange sections are chosen to maximize heat exchange efficiency, and at the same time to avoid excessive frictional airflow resistance in the channels.

According to a second aspect of the present invention, means are provided for adjusting the mixing proportion (hereinafter referred to as the "pre mixing ratio") of air drawn from the outdoor ambient environment, and air drawn from the habitable space, prior to passage of the intake air mixture into the dry-air channels of the heat exchanger.

According to a third aspect of the present invention, means are provided for regulating the proportions of the first and second auxiliary air streams diverted from the air volume output of the dry-air channels in the first heat exchange section issuing into the distributing chamber (hereinafter referred to as first and second "diversion ratios").

According to a fourth aspect of the present invention, the wet partitions are constructed from capillary-porous non-absorbent hydrophobic material, which may be impregnated with a hydrophilic surface agent, the combination of material and surface agent selected to impart wetting and vertical transport (wicking) properties to the necessary height above the water immersion surface.

Since the capillary-porous partitions are fabricated from a hydrophobic material, they have stable physical and chemical characteristics under contact with water, while treating the surfaces of the partitions with hydrophilic agents makes possible capillary moisture transport to the required height of the capillary-porous partitions.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
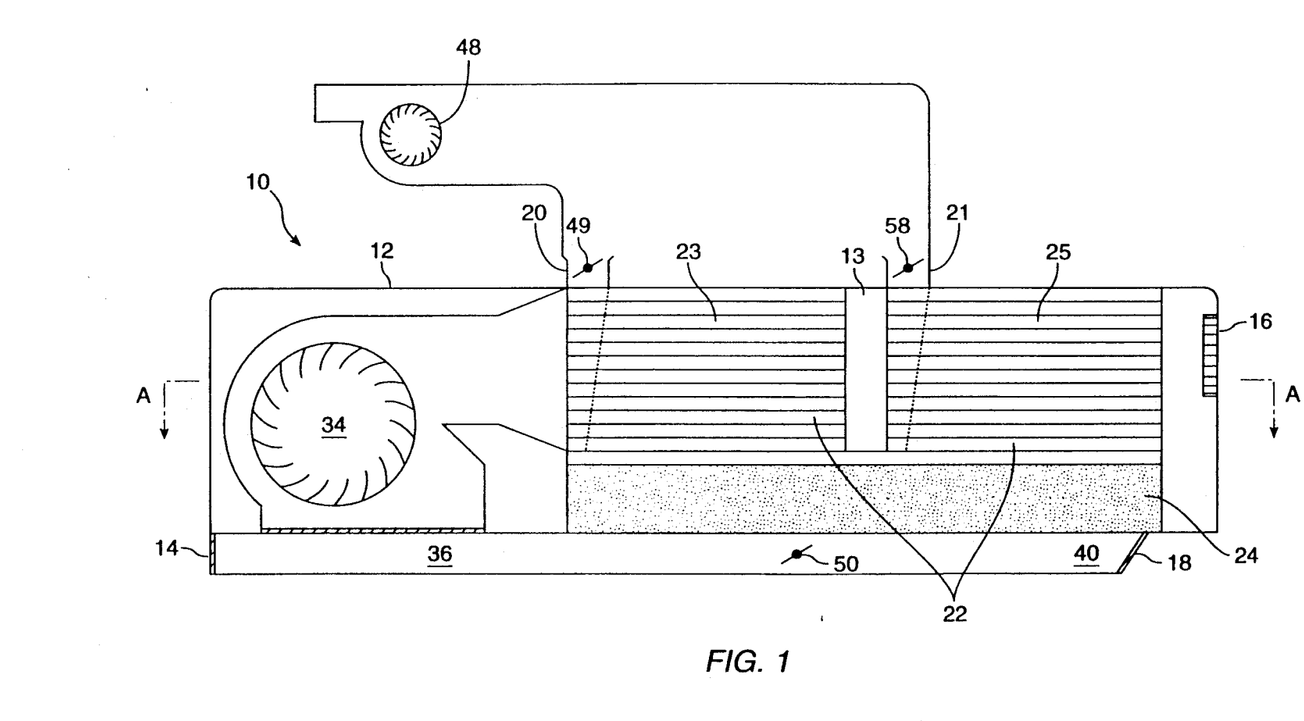
FIG. 1 is a side view of an apparatus for indirect-evaporative air cooling according to the present invention.
Figure 2:
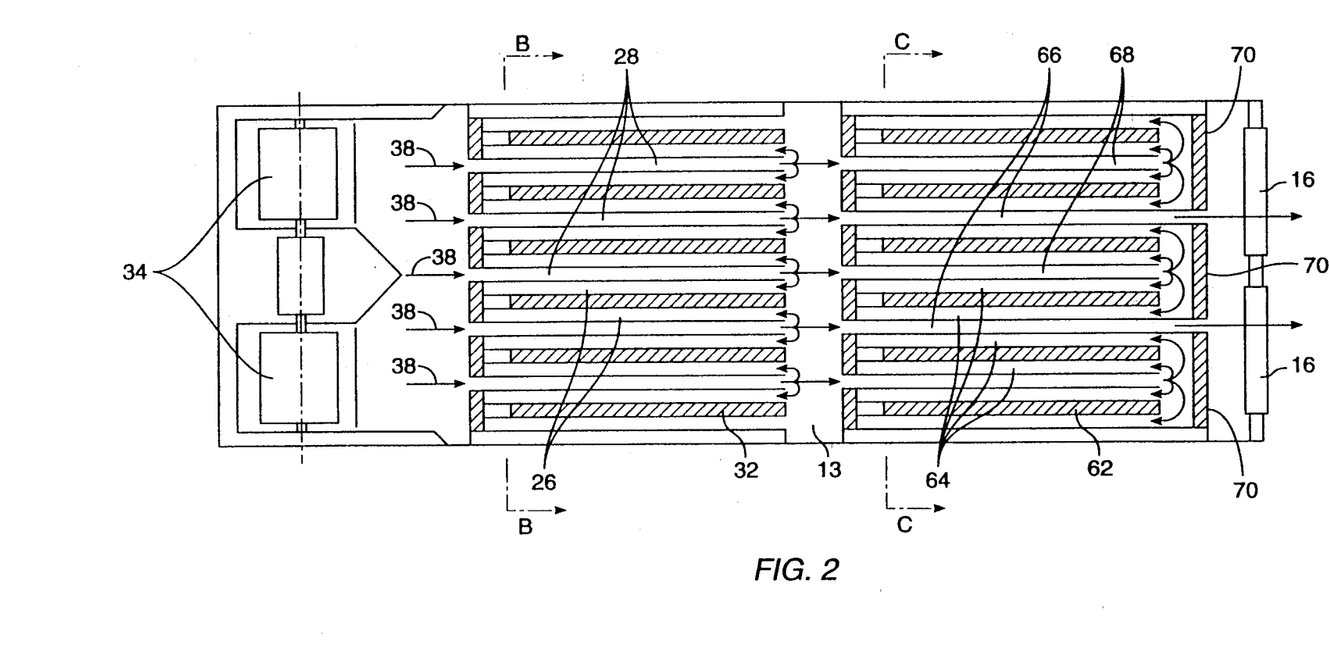
FIG. 2 is a cross-sectional view of the indirect-evaporative air cooling apparatus of FIG. 1 taken along the line A—A.
Figure 3A:
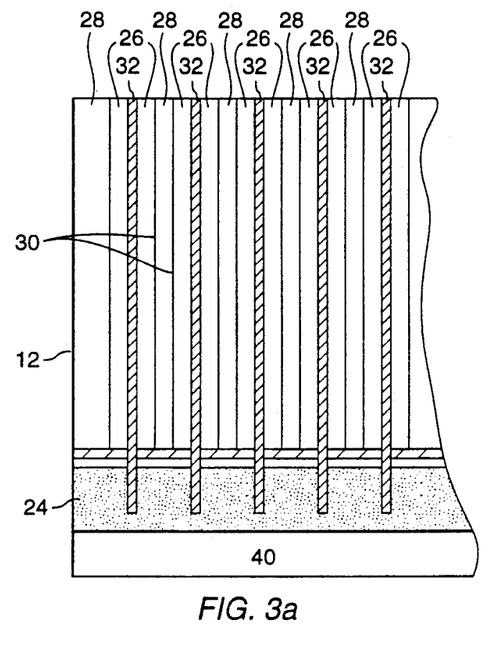
FIG. 3a is a cross-sectional view of the indirect-evaporative air cooling apparatus of FIGS. 1 and 2 taken along the line B—B of FIG. 2.
Figure 3B:
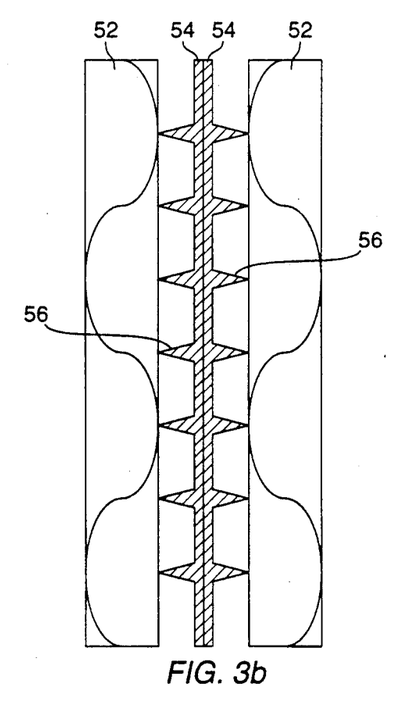
FIG. 3b is a detailed cross sectional view of a portion of the indirect-evaporative air cooling apparatus of FIG. 3a, showing a presently preferred structural detail.
Figure 4:
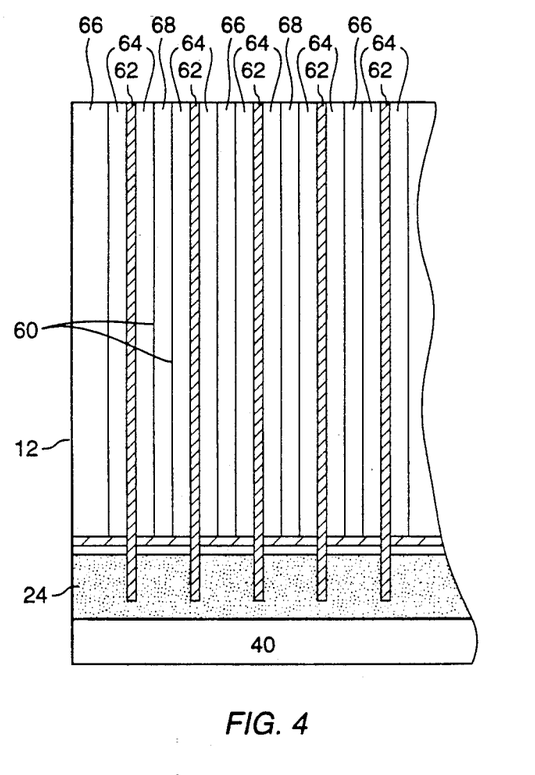
FIG. 4 is a cross-sectional view of a portion of the indirect-evaporative air cooling apparatus of FIGS. 1 and 2 taken along the line C—C of FIG. 2.

Referring to FIGS. 1-4, side, top cross-sectional, and end-cross-sectional views of a presently preferred embodiment of an indirect-evaporative air conditioning unit according to the present invention are shown. The cross-sectional view comprising FIG. 2 is taken along the lines A—A in FIG. 1, the cross-sectional view of FIG. 3a is taken along the lines B—B in FIG. 2, and the cross-sectional view of FIG. 4 is taken along the lines C—C in FIG. 2.

The air conditioning unit 10 of the present invention is housed within an appropriate enclosure 12. Enclosure 12 is equipped with at least one first intake aperture 14 for supplying outside ambient air to the air conditioner unit. First intake aperture 14 is located at a position on the enclosure 12 which communicates with the outside ambient environment when enclosure 12 is appropriately mounted to cool a habitable space.

A first outlet aperture 16 is provided for supplying cooled air to the habitable space. Outlet aperture 16 is located at a position on the enclosure 12 which communicates with the habitable space to be cooled when enclosure 12 is appropriately mounted between the habitable space and the outside ambient environment.

At least one second intake aperture 18 is provided for returning cooled air to the air conditioner unit from the habitable space. Second intake aperture 18 is located at a position on the enclosure 12 which communicates with the habitable space to be cooled when enclosure 12 is appropriately mounted to cool the habitable space.

A second outlet aperture 20 is provided for returning air to the outside ambient environment. Second outlet aperture 20 is located at a position on the enclosure 12 which communicates with the outside ambient environment when enclosure 12 is appropriately mounted between the habitable space and the outside ambient environment.

A third outlet aperture 21 is provided for returning air to the outside ambient environment. Third outlet aperture 21 is located at a position on the enclosure 12 which communicates with the outside ambient environment when enclosure 12 is appropriately mounted between the habitable space and the outside ambient environment.

A heat-exchanger unit 22 is disposed inside enclosure 12 above a water reservoir 24. Heat exchanger unit 22 comprises two separate heat exchange sections 23 and 25, communicating with an air-distributing chamber 13 in between. First heat exchange section 23 comprises alternating vertically-oriented wet-air channels (representative ones are shown at reference numerals 26) and dry-air channels (representative ones are shown at reference numerals 28). Wet-air channel 26 and dry-air channels 28 are separated from one another by vertical heat-exchanging partitions 30. One side of each heat-exchanging partition 30 forms a wall of a wet channel 26 and the other side of each heat-exchanging partition 30 forms the wall of a dry-air channel 28. Heat-exchanging partitions 30 may comprise a material such as aluminum, polypropylene or polyvinyl chloride (PVC).

A wet partition 32 comprising a sheet of capillary porous material is disposed in each of wet-air channel 26. Each wet partition 32 is oriented substantially parallel to the heat-exchanging partitions 30 and is positioned so as to substantially bisect the volume of the wet channel in which it is disposed. Those of ordinary skill in the art will appreciate that adequate support members are to be provided to assure that the wet partitions are maintained in their desired positions under the air flow conditions encountered in the wet-air channel.

Each of wet partitions 32 extends into the water reservoir 24 and is immersed in a volume of water contained therein. According to a presently preferred embodiment of the invention, wet partitions 32 may comprise a material such as porous polyethylene or porous PVC, and may be impregnated with a known surface active agent. Commonly available ionic surface active agents such as sodium alkyl benzene sulphonate are suitable, as are commonly available non-ionic surface active agents such as poly-oxy-acyl esters of alkyl phenols.

A first blower 34 communicates with first intake aperture 14 and functions to force air from the outside environment through a premixing chamber 36 and then through dry-air channels 28 as shown by arrows 38. First blower 34 also communicates with second intake aperture 18 from which it draws return air from the habitable space through plenums 40 into mixing chamber 36. As the air from mixing chamber 36 passes through dry-air channels 28, it is cooled by giving up some of its heat to heat-exchanging partitions 30. After the air passes through dry-air channels 28, it flows into distributing chamber 13.

A first auxiliary stream portion of the cooled air which has passed through dry-air channels 28 into distributing chamber 13 is directed into wet-air channel 26 in a counter-flow direction to the intake airstream in dry-air channels 28. The airstream is forced through wet-air channel 26 by the positive pressure in air distributing chamber 13 sustained by the action of first blower 34. In its passage through wet-air channel 26, the first auxiliary stream passes across the surfaces of wet partitions 32 where it loses heat by causing evaporation of some of the moisture drawn up from reservoir 24 by capillary action and contained on the surfaces of wet partitions 32. This air extracts heat from the wet channel surfaces of heat-exchanging partitions 30. The moisture-laden air which has passed through wet-air channel 26 is transferred to the outside environment through second outlet aperture 20. A second blower 48 may optionally be used to assist in scavenging the first auxiliary stream to the outside environment.

Of the air volume output issuing from dry-air channels 28 into distributing chamber 13, the relative portion of the first auxiliary stream diverted into wet-air channel 26 ("first diversion ratio") may be adjusted by the means of a regulator 49. For convenience, regulator 49 may installed at second outlet aperture 20. According to a presently preferred embodiment of the invention, the first diversion ratio should be between about one-eighth to about one-third of the air volume output issuing from dry-air channels 28.

Means are also provided to adjust the pre-mixing ratio. The pre-mixing ratio may be controlled by means such a regulator valve 50 positioned in each of plenums 40 such that they may be adjusted to partially restrict the flow of return air from the habitable space to first blower 34. According to a presently preferred embodiment of the invention, the pre-mixing ratio of outside air and return air from the habitable space may be adjusted from between about 1:0 to about 1:3.

According to a presently preferred embodiment of the invention, the widths of the wet and dry-air channels and the air-flow rates through the channels are chosen to produce substantially laminar air flow across the heat-exchange partitions and to substantially avoid turbulent air flow across those surfaces so as to achieve minimum flow resistance. For example, in an embodiment built according to the principles of the present invention, the dry-air channels have wall-to-wall widths of about 1.5 mm to 2.5 mm and the wet-air channel have widths measured between one heat-exchanging partition and the wet partition of about 0.6 mm to 1.5 mm. The flow rate in the dry and wet-air channel should be between about 2 to 5 meters/sec, with a Reynolds number not exceeding 2,000 based on the effective widths of the respective channels. As is well known in the art, the "effective width" of an air channel for laminar flow between opposing parallel plates is twice its physical width.

Referring now to FIG. 3b, a detailed cross sectional view of a portion of the first heat exchange section depicted in FIG. 3a is shown as fabricated according to a presently preferred embodiment of the invention. Each of the dry-air channels may comprise a section of corrugated laminated PVC material 52 known commercially as "impraboard" having internal longitudinal channels of about 2 mm by 4 mm in section. The wet partitions disposed between pairs of dry-air channels may comprise back-to-back sheets of formed porous polyethylene or PVC material 54 having ribs 56 for structural support.

Referring now to FIGS. 1, 2 and 4, second heat exchange section 25 comprises a plurality of vertically disposed, alternating dry-air channels and wet-air channels, the alternating dry-air channels and wet-air channels defined by substantially parallel opposing heat-transfer partitions. The alternating sequence is arranged in the following stacking order: (i) a primary dry-air channel (representative ones are shown at reference numeral 66), (ii) a wet-air channel (representative ones are shown at reference numeral 64), (iii) an auxiliary dry-air channel (representative ones are shown at reference numeral 68), and (iv) a wet-air channel 64; the aforementioned sequence of (i) through (iv) being repeated across the entire width of the second heat exchange section 25.

Wet-air channels 64 and dry-air channels 66 or 68 are separated from one another by vertical heat-exchanging partitions 60. One side of each heat-exchanging partition 60 forms a wall of a wet channel 64 and the other side of each heat-exchanging partition 60 forms the wall of a dry-air channel 66 or 68, as the case may be. Heat-exchanging partitions 60 may comprise a material such as aluminum, polypropylene or PVC.

A wet partition 62 comprising a sheet of capillary porous material is disposed in each of wet-air channel 64. Each wet partition 62 is oriented substantially parallel to the heat-exchanging partitions 60 and is positioned so as to substantially bisect the volume of the wet channel in which it is disposed. Those of ordinary skill in the art will appreciate that adequate support members are to be provided to assure that the wet partitions are maintained in their desired positions under the air flow conditions encountered in the wet-air channel.

Each of wet partitions 62 extends into the water reservoir 24 and is immersed in a volume of water contained therein. According to a presently preferred embodiment of the invention, wet partitions 62 may comprise a material such as porous polyethylene or porous PVC, and may be impregnated with a known surface active agent, as previously discussed.

The positive pressure in distributing chamber 13 sustained by first blower 34 causes a primary air stream to pass through primary dry-air channels 66, where it is cooled by giving up some of its heat to heat-exchanging partitions 60. After the air passes through dry-air channels 66, it flows through first outlet aperture 16 and thence into the space to be cooled as shown in FIG. 2 by the two arrows passing through first outlet aperture 16.

The positive pressure in air distributing chamber 13 also causes a second auxiliary airstream portion to flow into auxiliary dry-air channels 68, where it is cooled by giving up some of its heat to heat-exchanging partitions 60. At the far end, dry-air channels 68 communicate only with the intake end of wet-air channel 64. At the end of its passage through channels 68, the second auxiliary airstream is turned around by barriers 70 and is forced through wet-air channel 64 in a counter-flow direction to the airstreams in the primary and auxiliary dry-air channels 66 and 68 respectively. This air stream exits through third outlet aperture 21. Second blower 48 may optionally be used to assist in scavenging this air stream to the outside environment.

At the intake end of each wet channel 64, the vertical edge of each wet partition 62 is recessed slightly from the intake end of the wet channel itself, to a degree sufficient to allow the entering airstream to divide itself on both sides of the wet partition. In its passage through wet-air channel 64, the second auxiliary stream passes across the surfaces of wet partitions 62 where it loses heat by causing evaporation of some of the moisture drawn up from reservoir 24 by capillary action and contained on the surfaces of wet partitions 62. This air extracts heat from the wet channel surfaces of heat-exchanging partitions 60. The moisture-laden air which has passed through wet-air channel is transferred to the outside environment through third outlet aperture 21. A second blower 48 may optionally be used to assist in scavenging the second auxiliary stream to the outside environment.

Of the air volume output issuing from dry-air channels 28 into distributing chamber 13, the relative portion of the second auxiliary stream diverted into auxiliary dry-air channels 68 and thence into wet-air channel 64 ("second diversion ratio") may be adjusted by the means of a regulator 58. For convenience, regulator 58 may installed at outlet aperture 21. According to a presently preferred embodiment of the invention, the second diversion ratio should be between about one-eighth to about one-fourth of the air volume output issuing from dry-air channels 28.

The widths of the wet-air channel 64 and primary and auxiliary dry-air channels 66 and 68 in the second heat exchange section, and the air-flow rates through the channels are chosen to produce substantially laminar air flow across the heat-exchange partitions and to substantially avoid turbulent air flow across those surfaces so as to achieve minimum flow resistance. In a presently preferred embodiment of the invention, the wall-to-wall channel widths, airflow velocities, and other airflow parameters are the same as those in the first heat exchange section previously discussed.

The present invention has been shown to have important advantages over other similar apparatus in the prior art. Dividing the heat exchanger 22 into a first section 23 and second section 25 serves to reduce the continuous length of the respective dry and wet-air channel by one-half. This significantly reduces airflow resistance in the channels, yielding higher airflow velocities in the channels for the same power input to blower 34. Concurrently, the higher airflow velocities may be specified with lesser risk of exceeding the limiting conditions for laminar airflow as the airstreams progress down the length of the channels. As is well known in the art, a transition from laminar to turbulent flow within the channels will entail a drastic increase in airflow resistance, and hence power consumption in the blower. In comparison to other similar apparatus in the prior art, this invention yields either (i) a higher air delivery flow-rate, or (ii) air delivered at the same flowrate but through narrower channels, thereby improving heat exchange efficacy, resulting in delivery of cooler air. In either case, the concepts presented herein yield an increased useable cooling capacity for the same power input to the blower. As a consequence, energy efficiency is improved.

Various embodiments of the present invention may be suitable for application as a self-contained air conditioner for cooling a confined space in residential, commercial, industrial, heavy-automotive, and container-transport environments. The concepts described herein are particularly suited for automotive and transport applications, since the required airflow may be easily derived from the outside of a moving vehicle, and electrical blowers are required only to augment the airflow or to sustain operation when the vehicle is at rest.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A self-contained air conditioner unit comprising:
   an enclosure, said enclosure including a first intake aperture oriented to communicate with outside ambient air and a first outlet aperture positioned to communicate with a habitable space in which said air conditioner is placed, and a second intake aperture positioned to communicate with a habitable space and second and third outlet apertures positioned to communicate with ambient air outside of said habitable space;
   a water reservoir disposed in said enclosure;
   a premixing chamber disposed in said enclosure, and communicating with said first and second intake apertures, for premixing air from said first and said second intake apertures;
   an air-distributing chamber disposed in said enclosure;
   a first heat exchanger section disposed over said water reservoir in said enclosure, said first heat exchanger section comprising a plurality of vertically disposed, alternating first wet air channels and first dry air channels each having intake and outlet ends, said intake ends of said first wet channels and said outlet ends of said first dry channels communicating with said air-distributing chamber, and said outlet ends of said first wet channels being located proximate to said intake ends of said first dry channels, said alternating first wet air channels and first dry air channels defined by substantially parallel opposing heat-exchanging surfaces, each of said first dry channels communicating with said premixing chamber at said intake ends thereof, and each of said first wet channels communicating with said second outlet aperture at said outlet ends thereof;
   a second heat exchanger section disposed over said water reservoir in said enclosure, said second heat exchanger section comprising a plurality of vertically disposed, alternating second wet air channels and second dry air channels each having intake and outlet ends, first ones of said second dry channels having their intake ends communicating with said air-distributing chamber and their output ends communicating with said first outlet aperture, and second ones of said second dry channels having their intake ends communicating with said air-distributing chamber and their output ends communicating with said second wet air channels in said second heat exchanger section, the output ends of said second wet air channels in said second heat exchanger section communicating with said third outlet aperture;

a wet partition comprising a capillary porous material disposed in each of said first and second wet channels, each wet partition disposed in a plane substantially parallel to said opposing heat-exchanging surfaces and positioned so as to substantially bisect the volume of said wet channel in which it is disposed, each of said wet partitions extending into said water reservoir and immersed in a volume of water contained therein;

first air moving means for forcing a volume of air from said first and second intake apertures, through said premixing chamber and into said first dry channels in said first heat exchanger section, said air moving means sufficient to maintain a positive pressure in said air-distributing chamber; and wherein the cross sectional areas of the wet and dry channels and the air moving means are selected so as to provide air flow velocities which promote laminar air flow and to substantially eliminate turbulent air flow across all surfaces defining all of said wet air channels and dry air channels.

2. The air conditioner of claim 1, further including premixing means for adjusting the proportion of air drawn from said first and second intake apertures.

3. The air conditioner of claim 2, wherein said premixing means is capable of adjusting the proportion of air drawn from said first and second intake apertures from about 1:0 to about 1:3.

4. The air conditioner of claim 1 further including means for independently variably restricting the relative volumes of air passing through said second and third outlet apertures.

5. The air conditioner of claim 4 wherein said means for independently variably restricting may vary the volume of air passing through said second outlet aperture from about one eighth to one third of the air volume output issuing from said first dry channels.

6. The air conditioner of claim 4 wherein said means for independently variably restricting may vary the volume of air passing through said third outlet aperture from about one eighth to one fourth of the air volume output issuing from said first dry channels.

7. The air conditioner of claim 1 wherein said wet partitions are impregnated with a surface active agent.

8. The air conditioner of claim 1 wherein said first air moving means comprises a first blower.

9. The air conditioner of claim 1 wherein the cross sectional areas of the wet and dry channels and the air moving means are selected so as to provide air flow velocities which promote laminar air flow with a Reynolds number below 2,000 based on the effective widths of said wet and dry channels.

10. The air conditioner of claim 1 further including second air moving means for drawing air from the said second and third outlet apertures to said ambient air outside of said habitable space.

11. The air conditioner of claim 10 wherein said second air moving means comprises a second blower.

* * * * *